(12) United States Patent
Palmer

(10) Patent No.: US 11,886,350 B2
(45) Date of Patent: Jan. 30, 2024

(54) SYSTEM MEMORY CONTEXT DETERMINATION FOR INTEGRITY MONITORING AND RELATED TECHNIQUES

(71) Applicant: Raytheon Company, Waltham, MA (US)

(72) Inventor: Nathan T. Palmer, Austin, TX (US)

(73) Assignee: Raytheon Company, Waltham, MA (US)

( * ) Notice: Subject to any disclaimer, the term of this patent is extended or adjusted under 35 U.S.C. 154(b) by 542 days.

(21) Appl. No.: 17/034,035

(22) Filed: Sep. 28, 2020

(65) Prior Publication Data

US 2021/0182208 A1 Jun. 17, 2021

Related U.S. Application Data

(60) Provisional application No. 62/947,112, filed on Dec. 12, 2019.

(51) Int. Cl.
| | |
|---|---|
| *G06F 12/1009* | (2016.01) |
| *G06F 12/14* | (2006.01) |
| *G06F 12/0882* | (2016.01) |
| *G06F 11/30* | (2006.01) |
| *G06F 9/455* | (2018.01) |
| *G06F 9/4401* | (2018.01) |

(52) U.S. Cl.
CPC ........ *G06F 12/1009* (2013.01); *G06F 9/4406* (2013.01); *G06F 9/45558* (2013.01); *G06F 11/3037* (2013.01); *G06F 12/0882* (2013.01); *G06F 12/1408* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 11,386,153 | B1* | 7/2022 | Greene | .................. G06F 16/81 |
| 2010/0030996 | A1* | 2/2010 | Butler, II | .............. G06F 21/577 |
| | | | | 707/E17.014 |
| 2012/0137045 | A1* | 5/2012 | Bacher | ................ G06F 9/45558 |
| | | | | 711/6 |
| 2016/0371101 | A1* | 12/2016 | Beale | .................... G06F 3/0617 |
| 2019/0369903 | A1* | 12/2019 | Tsirkin | ................ G06F 12/1036 |
| 2020/0409868 | A1* | 12/2020 | Durham | ............. G06F 12/1009 |

\* cited by examiner

*Primary Examiner* — Wynuel S Aquino
(74) *Attorney, Agent, or Firm* — DALY, CROWLEY, MOFFORD & DURKEE, LLP

(57) ABSTRACT

Techniques are disclosed for context-aware monitoring of the system memory to provide system integrity. An example methodology implementing the techniques includes determining a type of operating system (OS) that is loaded on system memory, examining contents of at least one system memory page, and assigning at least one tag to the at least one system memory page based on the determined type of OS and the examination of the contents of the at least one system memory page. The at least one tag indicates the characteristics of the contents of the at least one system memory page.

12 Claims, 11 Drawing Sheets

SYSTEM MEMORY CONTEXT DETERMINATION FOR INTEGRITY MONITORING AND RELATED TECHNIQUES

CROSS-REFERENCE TO RELATED APPLICATION

This application claims the benefit of and priority to U.S. Provisional Application No. 62/947,112, filed on Dec. 12, 2019, which is herein incorporated by reference in its entirety.

BACKGROUND

Malware refers to any software intentionally or accidentally designed to infiltrate or damage a computer system. Examples of malware include viruses, worms, trojan horses, rootkits, adware, spyware and any other malicious and unwanted software. For example, an attacker can modify application or operating system memory in order to inject malicious code into a computer system. Detection of sophisticated forms of such malware attacks may require monitoring of the system memory from outside of the main central processing unit (CPU).

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a computer-implemented method may include determining, by a hypervisor, a type of operating system (OS) that is loaded on system memory, examining contents of at least one system memory page, and assigning at least one tag to the at least one system memory page based on the determined type of OS and the examination of the contents of the at least one system memory page. The at least one tag may indicate characteristics of the contents of the at least one system memory page.

In one aspect, the at least one tag indicates that the at least one system memory page is a critical system memory page, and the method may also include hashing the contents of the at least one system memory page to compute a hash value, and comparing the computed hash value to a corresponding golden hash value to determine the integrity of the least one system memory page.

According to another illustrative embodiment provided to illustrate the broader concepts described herein, a system includes one or more non-transitory machine-readable mediums configured to store instructions, and one or more processors configured to execute the instructions stored on the one or more non-transitory machine-readable mediums. Execution of the instructions may cause the one or more processors to, determine a type of operating system (OS) that is loaded on system memory, examine contents of at least one system memory page, and assign at least one tag to the at least one system memory page based on the determined type of OS and the examination of the contents of the at least one system memory page, wherein the at least one tag indicates characteristics of the contents stored in the at least one system memory page.

In one aspect, to determine the type of OS is based on an OS boot fingerprint.

In one aspect, the at least one tag indicates that the at least one system memory page is a critical system memory page, and execution of the instructions may further cause the one or more processors to hash the contents of the at least one system memory page to compute a hash value, and compare the computed hash value to a corresponding golden hash value to determine the integrity of the least one system memory page.

In accordance with another illustrative embodiment provided to illustrate the broader concepts described herein, a computer program product includes one or more non-transitory machine-readable mediums encoding instructions that when executed by one or more processors cause a process to be carried out. The process may include determining a type of operating system (OS) that is loaded on system memory, examining contents of at least one system memory page, and assigning at least one tag to the at least one system memory page based on the determined type of OS and the examination of the contents of the at least one system memory page. The at least one tag may indicate characteristics of the contents of the at least one system memory page.

In one aspect, the at least one tag indicates that the at least one system memory page is a critical system memory page, and the process may also include hashing the contents of the at least one system memory page to compute a hash value, and comparing the computed hash value to a corresponding golden hash value to determine the integrity of the least one system memory page.

In one aspect, determining a type of operating system (OS) that is loaded on system memory is performed by a hypervisor.

In one aspect, determining the type of OS is based on an OS boot fingerprint.

In one aspect, the at least one tag is included in an extended page table (EPT).

In one aspect, the at least one tag indicates a type of data stored in the at least one system memory page.

In one aspect, the at least one tag indicates that the at least one system memory page is a critical system memory page.

These and other features of the present embodiments will be understood better by reading the following detailed description, taken together with the figures herein described.

DETAILED DESCRIPTION

Relative descriptions used herein, such as left, right, up, and down, are with reference to the figures, are merely relative and not meant in a limiting sense. Additionally, for clarity, common items and circuitry, such as integrated circuits, resistors, capacitors, transistors, and the like, have not been included in the figures, as can be appreciated by those of ordinary skill in the pertinent art. Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

Figure 1:
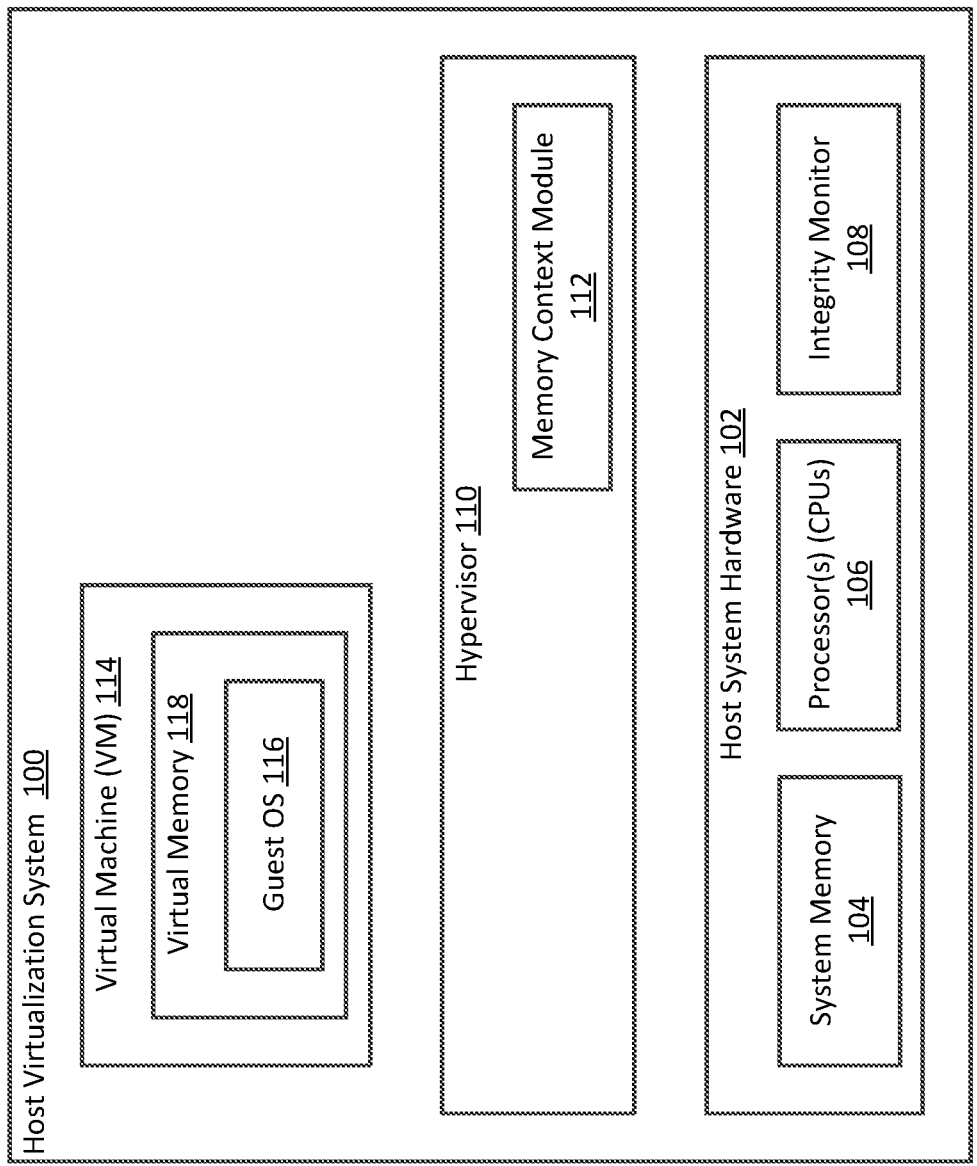
FIG. 1 is a block diagram illustrating selective components of an example host virtualization system, in accordance with an embodiment of the present disclosure.

Referring to the figures, FIG. 1 is a block diagram illustrating selective components of an example host virtualization system 100, in accordance with an embodiment of the present disclosure. In brief, as will be further described below, host virtualization system 100 can be understood as enabling context-aware monitoring of the system memory to provide system integrity. In some embodiments, host virtualization system 100 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that has sufficient processor power and memory capacity to perform the operations described in this disclosure.

As shown in FIG. 1, host virtualization system 100 includes a host system hardware 102, which further includes a system memory 104, one or more processors or central processing units (CPUs) 106, and an integrity monitor 108. In general, host system hardware 102 provides the physical system resources for virtualization system 100. To this end, in some implementations, host system hardware 102 may also include one or more physical devices (e.g., input/output (I/O) devices), one or more physical disks (e.g., internal and/or external hard disks), and one or more network interface cards (NICs), to provide a few examples.

System memory 104 may include computer-readable storage media that is shared or sharable among the components and/or devices of a system, such as host virtualization system 100. Such computer-readable storage media may include any available media that may be accessed by a general-purpose or special-purpose computer, such as processor 106. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. In some implementations, system memory 104 may also include any type of computer-readable storage media configured for short-term or long-term storage of data, such as, a hard drive, solid-state drive, Read-Only Memory (ROM), Electrically Erasable Programmable Read-Only Memory (EEPROM), a redundant array of independent disks (RAID), Compact Disc Read-Only Memory (CD-ROM) or other optical disk storage, magnetic disk storage or other magnetic storage devices, flash memory devices (e.g., solid state memory devices), or any other storage medium. Combinations of the above may also be included within the scope of computer-readable storage media. System memory 104 may store firmware, data, programs, and executable instructions, which may be executed by one or more processors 106.

Processor 106 may include any suitable special-purpose or general-purpose computer, computing entity, or computing or processing device including various computer hardware, or firmware, and may be configured to execute instructions, such as program instructions, stored on any applicable computer-readable storage media, such as system memory 104, for instance. For example, processor 106 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi-core, or any other digital or analog circuitry configured to interpret and/or to execute program instructions and/or to process data, whether loaded from memory or implemented directly in hardware. Although illustrated as a single processor in FIG. 1, processor 106 may include any number of processors and/or processor cores configured to, individually or collectively, perform or direct performance of any number of operations described in the present disclosure. Processor 106 may include one or more coprocessors or controllers, such as an audio processor or a graphics processing unit, to assist in its processing operations. In an embodiment, processor 106 includes one or more multicore processors.

Integrity monitor 108 may be configured to provide out-of-band context-aware monitoring of system memory, such as system memory 104. For example, in an implementation, integrity monitor 108 may provide an interface, such as a driver interface, that allows for communicating and/or interacting with integrity monitor 108. For example, a component of host virtualization system 100 (such as a hypervisor 110 or a memory context module 112 described below) may employ the interface provided by integrity monitor 108 to request out-of-band monitoring of one or more pages of system memory 104. The monitoring request may include respective golden hash values for the specified pages of system memory 104. Upon receiving the request, integrity monitor 108 may hash the contents of the specified system memory 104 pages and compare the computed hash values to the corresponding golden hash values to determine the integrity of the specified system memory 104 pages and/or host virtualization system 100.

In some embodiments, integrity monitor 108 is programmed or otherwise configured to identify critical or important system memory 104 pages for monitoring. The critical system memory 104 pages are the pages whose contents should be monitored to determine the integrity the critical system memory 104 pages and/or host virtualization system 100. For example, the developer of integrity monitor 108 may have coded or otherwise developed integrity monitor 108 to monitor system memory 104 pages that store or otherwise contain certain data or data structures, such as system call tables, device access lists, immutable system code, critical security code, and user access controls, to provide a few examples. In this case, integrity monitor 108 may obtain from hypervisor 110 or memory context module 112, which are further described below, location information (e.g., physical memory addresses) for the system memory 104 pages that are storing these data or data structures, and the respective golden hash values for these system memory 104 pages. Integrity monitor 108 may then perform the integrity check of these pages by hashing the contents of the system memory 104 pages and comparing the computed hash values to the corresponding golden hash values.

In some embodiments, integrity monitor 108 may be configured to provide "hot patching" of system memory 104. For example, a page of system memory 104 being monitored may store an access control list (ACL) for a firewall, and the contents of this page should not be altered. However, an integrity check of this page of system memory 104 may indicate that the contents of the page have been altered or tampered with. In this case, integrity monitor 108 may perform hot patching of the page to restore the contents of the page to the "original" contents (i.e., the original ACL for the firewall). In an implementation, integrity monitor 18 may obtain the original contents from hypervisor 110 or memory context module 112 further described below. Alternatively, integrity monitor 108 may save the original contents of the page of system memory 104 at or about the time integrity monitor 108 starts monitoring the page of system memory 104. Other examples of "hot patching" may include restoration of critical control software, restoration of safe-mode software, and repair of critical drivers, to provide a few examples.

Referring still to FIG. 1, host virtualization system 100 includes hypervisor (or so-called virtual machine monitor) 110, which further includes memory context module 112. In brief, hypervisor 110 is similar to a kernel process for standard operating systems, including hardware support. Hypervisor 110 may be configured to present a virtual hardware interface to VM environments, handle scheduling of system resources between VM environments, and allocate required resources as needed by each VM environment. In the Type-I implementation, hypervisor 110 provides software emulation of host system hardware 102.

In some embodiments, hypervisor 110 may be configured to provision one or more guest VMs, such as one or more VMs 114 as shown in FIG. 1. In general, virtual machines are based on computer architectures and provide a virtual view of the physical hardware, memory, processor, and other system resources available on a physical computing system. For example, hypervisor 110 can load a virtual machine image to generate VM 114. In an implementation, VM 114 can include a program (e.g., set of executable instructions) that, when executed by a processor, such as processor 106, emulates (e.g., imitates) the operation of a computing system. The emulation allows programs and processes to be executed in guest VM 114 in a manner similar to being executed on the computing system being emulated. While only one VM 114 is depicted in FIG. 1 for purposes of clarity, it will be appreciated that hypervisor 110 can provision any number of virtual machines (e.g., host virtualization system 100 can host any number of VMs 114).

In some embodiments, the provisioned guest VMs can be configured to provide similar virtual views of the physical hardware, memory, processor, and other system resources available to the guest VMs. In some embodiments, some provisioned guest VMs may provide virtual views of the physical hardware, memory, processor, and other system resources that are distinct (e.g., a virtual view that is specific to a guest VM) to the guest VM. In any case, the virtual view provided by a guest VM can be based on, for example, VM permissions, application of policy rules, the user accessing the guest VM, the applications that are to run on the guest VM, networks to be accessed by the guest VM, or any other desired criteria.

As can be seen in FIG. 1, VM 114 may include a guest operating system (OS) 116. For example, guest OS 116 may execute on a virtual processor within VM 114. Guest OS 116 may include any suitable operating system, such as Microsoft Windows®, Linux®, MacOS®, iOS®, or Android™, to provide a few examples. Guest OS 116 may provide users of VM 114, such as applications running within VM 114, access to resources that are being virtualized by VM 114. Such applications running within VM 114 may include any suitable software application, such as an image viewing application, an audio application, a video application, a browsing application (e.g., Internet browser), an electronic communications application (e.g., e-mail application), a social media application, a word processing application, a graphics application, or any other suitable application.

VM 114 may include virtual memory 118. Virtual memory 118 may include memory allocated to processes and applications within VM 114 on which guest OS 116 runs. In brief, virtual memory 118 may provide a mapping of the host physical memory (e.g., system memory 104) such that the host physical memory may appear as a contiguous area of memory. In an implementation, the virtual memory mapping may extend beyond the memory (e.g., RAM) of the host system. For example, the virtual memory mapping may extend to external memory regions, such as, for example, memory backed by RAM on a graphics chip, as one example. Virtual memory 118 can correspond to, for example, memory or portions of the memory, such as system memory 104, of host virtualization system 100. In this regard, virtual memory 118 may serve as physical memory for VM 114. The amount of virtual memory 118 that is allocated to VM 114 may depend on memory resource settings and contention for system memory 104, for example. As an example, assuming the host physical memory includes 16 GB of RAM, hypervisor 110 may allocate the 16 GB of RAM to VM 114. Alternatively, hypervisor 110 may allocate a portion, for example, 2 GB, of the 16 GB of RAM to VM 114 and allocate some or all of the remaining 14 GB of RM to one or more other guest VMs.

Hypervisor 110 may allocate memory to VM 114 using memory pages. A memory page may be of a fixed size, such as, for example, 4 KB block of memory. Guest OS 116 of VM 114 may implement and manage one or more page tables for the memory pages allocated to VM 114. For example, the page tables may include page table entries, where a page table entry in a page table maps a guest virtual memory (GVM) page to a corresponding guest physical memory (GPM) page. Thus, the page tables map (or convert) a virtual address in the guest virtual memory address space to a corresponding physical address in the guest physical memory address space. The page tables may be in the form of a hierarchy of page tables, some of which map virtual addresses to intermediate page table addresses. In a virtualized environment, such as that of host virtualization system 100, the page tables managed by guest OS 116 are also virtualized, wherein a guest physical memory address indicated by the page tables is further mapped to a corresponding host physical memory address in the memory map of host system hardware 102.

Figure 2:
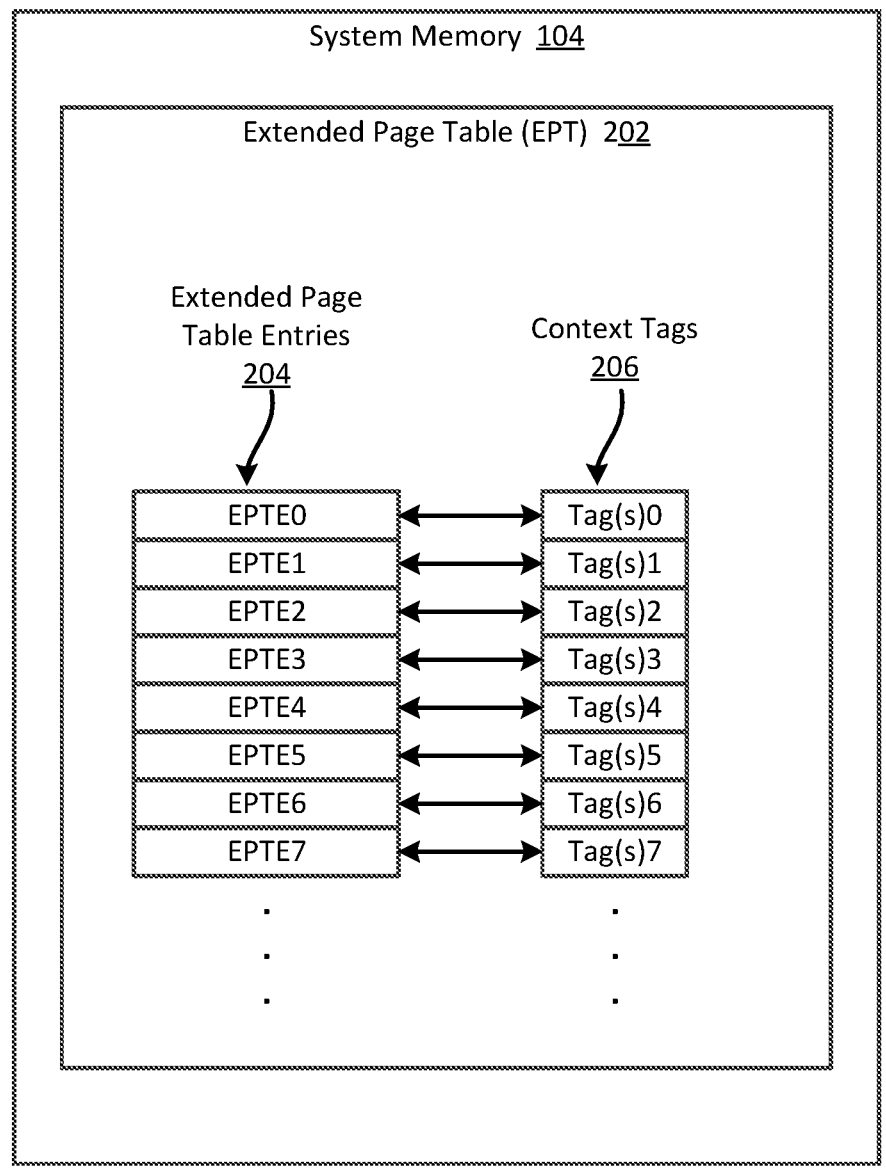
FIG. 2 is a diagram illustrating an example extended page table (EPT) having extended page table entries and associated context tags, in accordance with an embodiment of the present disclosure.

Referring to FIG. 2, in accordance with an embodiment of the present disclosure, hypervisor 110 may implement and manage an extended page table (EPT) 202 that maps guest physical memory addresses to corresponding host physical memory addresses. EPT 202 may be stored or otherwise maintained in system memory 104. The host physical memory address space may be organized according to host physical memory (HPM) pages (e.g., 4 KB memory pages). The memory pages may be associated with a respective identifier that identifies the memory page. In an implementation, and as shown in FIG. 2, EPT 202 may include extended page table entries 204 and associated context tags 206. A particular extended page table entry 204 may specify a mapping from a GPM page to a corresponding HPM page. In operation, when a process running on guest OS 116 accesses memory, a first level of address translation (e.g., GVM address to GPM address) occurs using the page tables maintained by guest OS 116, and a second level of address translation (e.g., GPM address to HPM address) occurs using EPT 202 maintained by hypervisor 110. In embodiments, a hardware component, such as a memory management unit (MMU), may perform the address translations.

Context tag(s) 206 assigned to or otherwise associated with extended page table entries 204 may indicate the context or characteristics of the data and/or information stored in the HPM pages referenced by the extended page table entries 204. For example, Tags® associated with EPTE0 may indicate the context or characteristics of the data and/or information stored in the HPM page referenced by EPTE0. Similarly, Tags1 associated with EPTE1 may indicate the context or characteristics of the data and/or information stored in the HPM page referenced by EPTE1, and so forth for the other extended page table entries 204 (e.g., EPTE2, EPTE3, and so on) in EPT 202. The assigned context tag(s) 206 provide insight as to the type of data/ information stored in the HPM pages. By way of non-limiting examples, context tag(s) 206 may indicate that the referenced HPM page is associated with a particular VM (e.g., VM 114), a particular OS (e.g., guest OS 116), a particular type of OS (e.g., WINDOWS, UNIX, iOS, etc.), a kernel page (e.g., the HPM page is associated with kernel space), a particular part of kernel space (e.g., the data stored in the HPM page is associated with a particular driver or a particular purpose of the kernel, such as, an access control list, a system call table, monitoring software, or code integrity checking software), a user space page (e.g., the HPM page is associated with user space, such as a user space application), and may label a page as read-only or non-executable.

In some embodiments, memory context module 112 is programmed or otherwise configured to assign context tag(s) 206 to extended page table entries 204. In an implementation, memory context module 112 can examine or analyze the data/information loaded in the HPM pages when a provisioned OS (e.g., guest OS 116) is started and, based on OS boot fingerprints of various OSs, infer a type of OS that is loaded on the HPM pages. For example, the boot code for an OS, such as WINDOWS 10, may allocate certain HPM pages and store particular aspects of the OS in specific addresses in the allocated HPM pages. Much like a human fingerprint, the boot code for an OS may differentiate the particular OS from other OSs. Based on an examination of the OS boot fingerprint (e.g., data/information stored in these HPM pages), memory context module 112 can infer a type of OS (e.g., WINDOWS 10) that is loaded on these HPM pages. Having inferred the type of OS that is loaded, memory context module 112 can tag the HPM pages with context tags that indicate the type of data/information stored in the HPM pages. In particular, memory context module 112 can assign to extended page table entries 204 referencing the HPM pages context tag(s) 206 that indicate the type of stored data/information. For example, suppose an HPM page stores data associated with the OS kernel. In this case, memory context module 112 can assign to extended page table entry 204 referencing this HPM page context tag 206 that indicates the HPM page is associated with kernel space for the inferred OS. As another example, suppose an HPM page stores a system call table. In this case, memory context module 112 can assign to extended page table entry 204 referencing this HPM page context tag 206 that indicates the data stored in the HPM page is a system call table for the inferred OS. This inference may be made based on a priori knowledge of where (e.g., spatially) a given OS locates data structures in memory or when (e.g., temporally) memory is referenced over time. For example, the first N page accesses may be assumed to be critical memory for a given OS. Further checks may be applied to the memory to verify that the assumptions made are correct.

The assigned context tag(s) 206 contextualize the HPM pages and allow for context-aware monitoring of the system memory, such as system memory 104. The assigned context tag(s) 206 provide the context to determine which HPM pages are critical and, thus, may be monitored to provide system integrity.

In some embodiments, memory context module 112 is programmed or otherwise configured to provide an interface, such as an application programming interface (API), that allows for communicating and/or interacting with memory context module 112 and/or hypervisor 110. The provided interface may allow for requesting monitoring of specified memory pages. The provided interface may also allow for applying context to a request, such as which application is requesting the monitoring and any action to perform in case of failure. For example, an application running within VM 114 may employ the interface provided by memory context module 112 to request monitoring of specified memory pages.

In some embodiments, memory context module 112 is programmed or otherwise configured to establish (or reestablish) coherence between caches maintained by VMs, such as VM 114, provisioned in host virtualization system 100 and system memory 104. As an example, suppose a process running on guest OS 116 of VM 114 is performing operations on (e.g., writing data to) a page of system memory 104 that is being monitored, for example, by integrity monitor 108. Here, it may be that the operations are being performed on cache memory maintained by VM 114 and not on system memory 104. That is, in the case of a memory write operation, the data may be being written to cache memory and not to system memory 104. In such cases, the contents of system memory 104 may be incoherent with the contents of the cache maintained by VM 114. In other words, the contents of system memory 104 may not actually reflect the state of host virtualization system 100. As a result, monitoring the data stored in the page of system memory 104 may not provide an accurate indication of the integrity of host virtualization system 100 or components thereof.

In an implementation, to provide or otherwise establish data coherence between caches maintained by VMs and system memory 102, memory context module 112 may identify the HPM pages that are being monitored, for example, by integrity monitor 108. Memory context module 112 may then continually and/or periodically request or otherwise cause CPU 106 or other suitable processor to perform a flush or other coherency-inducing operation of the caches of the identified HPM pages (i.e., caches of the memory pages that are being monitored) to system memory 104. In embodiments, memory context module 112 may continually and/or periodically request CPU 106 to perform the coherency-inducing operation every 90 milliseconds (ms), 100 ms, 120 ms, or other suitable interval of time. The time interval may be selected or tunable based on the frequency or rate of the monitoring of the HPM pages in system memory 102. Continually reestablishing data coherence in this manner ensures that the monitoring performed subsequent to reestablishing data coherence is of HPM pages in system memory 102 that accurately reflect the state of host virtualization system 100.

In some embodiments, memory context module 112 is programmed or otherwise configured to provide integrity monitor 108 access to system memory 104. For example, in an implementation, integrity monitor 108 may access system memory 104 and various other components of host virtualization system 100 via a suitable communication bus, such as Peripheral Component Interconnect Express (PCIe) bus. The PCIe bus may allow devices connected or communicatively coupled to the PCIe bus to perform direct memory access (DMA) transactions. Using this capability, integrity monitor 108 may perform monitoring of critical system memory 104 pages. However, in some cases, CPU 106 of host virtualization system 100 may restrict DMA capabilities of various devices, including integrity monitor 108, over the PCIe bus. For example, CPU 106 may restrict DMA capabilities of a video card to a particular system memory 104 address range(s) and a network card to another, different system memory 104 address range(s). Similarly, CPU 106 may restrict DMA capabilities of integrity monitor 108 to a portion of system memory 104. This may prevent integrity monitor 108 from monitoring the critical system memory 104 pages. In such cases, memory context module 112 may request CPU 106 to not restrict DMA capabilities of integrity monitor 108 (i.e., allow integrity monitor 108 to perform DMA transactions with system memory 104, including the critical system memory 104 pages).

In some embodiments, memory context module 112 is programmed or otherwise configured to provide data encryption of critical system memory 104 pages. The data encryption may be performed according to an appropriate encryption algorithm (e.g., Advanced Encryption Standard (AES) 28-bit, AES 256-bit, Triple Data Encryption Standard (3-DES), etc.) to provide data security and allow secure access to the contents of critical system memory 104 pages. For example, memory context module 112 may encrypt the contents of a critical page and store the contents of the page in encrypted from in system memory 104. Memory context module 112 may assign to the EPTE associated with the encrypted critical page a context tag (e.g. context tag 206) that indicates that the contents of the page have been encrypted. Memory context module 112 may store the decryption key(s) that is needed to decrypt the encrypted contents on integrity monitor 108. Subsequently, when the encrypted critical system memory 104 page is requested, memory context module 112 may retrieve the appropriate decryption key from integrity monitor 108 and use the retrieved decryption key to decrypt the encrypted contents of the requested critical system memory 104 page. Memory context module 112 may then provide or otherwise make available the decrypted contents of the requested critical system memory 104 page. In some embodiments, the decryption of the encrypted contents may be performed by integrity monitor 108. In some embodiments, integrity monitor 108 may provide the data encryption service.

Figure 3:
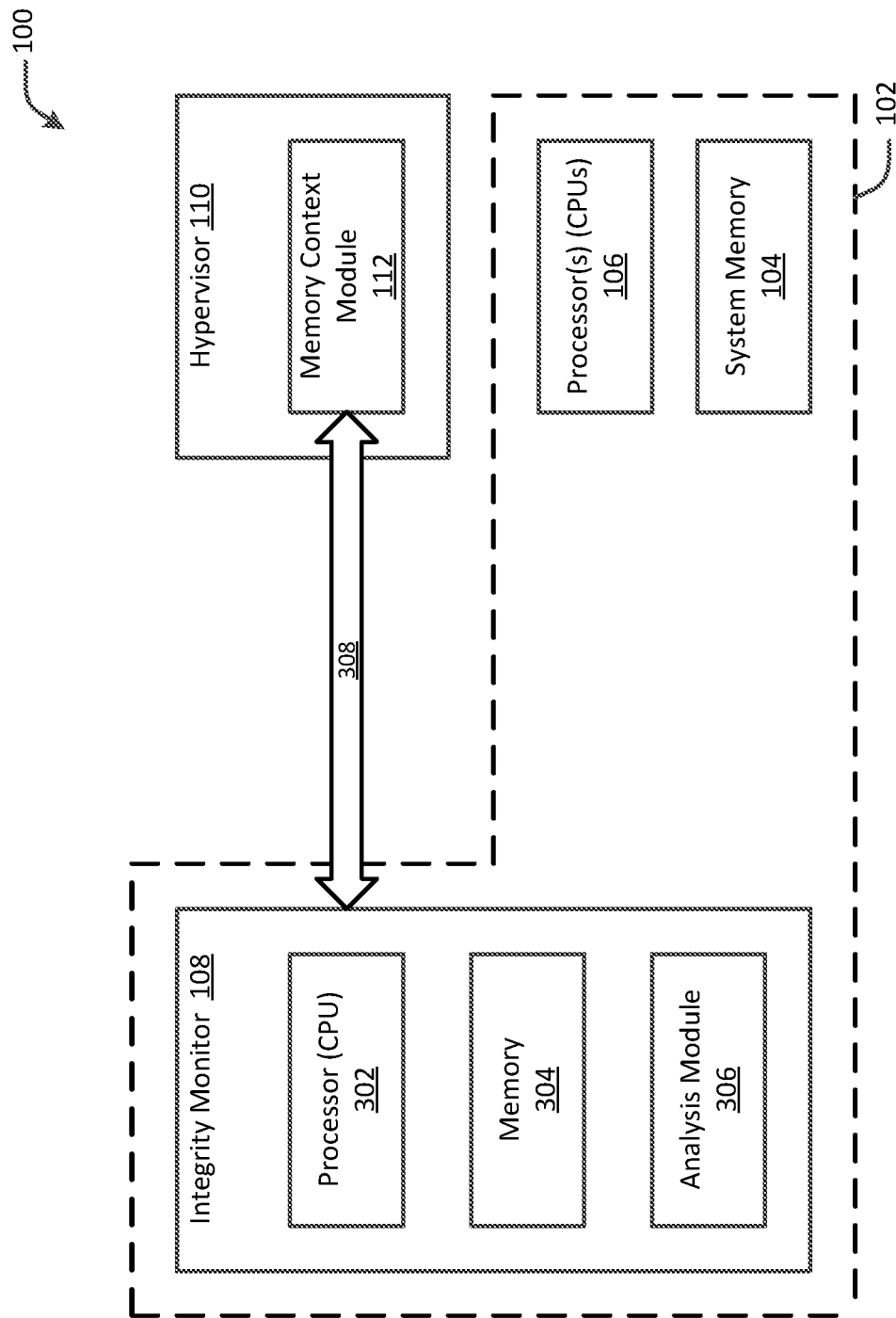
FIG. 3 is a block diagram illustrating selective components of an integrity monitor of the host virtualization system of FIG. 1, in accordance with an embodiment of the present disclosure.

FIG. 3 is a block diagram illustrating selective components of integrity monitor 108 of host virtualization system 100 of FIG. 1, in accordance with an embodiment of the present disclosure. The integrity monitor illustrated in FIG. 3 is substantially similar to the integrity monitor illustrated in FIG. 1, with additional details. Unless context dictates otherwise, those components in FIG. 3 that are labelled identically to components of FIG. 1 will not be described again for the purposes of clarity.

As shown in FIG. 3, integrity monitor 108 may include a processor (CPU) 302, a memory 304, and an analysis module 306. Similar to processor 106 described previously, processor 302 may include any suitable special-purpose or general-purpose computer, computing entity, or computing or processing device including various computer hardware, or firmware, and may be configured to execute instructions, such as program instructions, stored on any applicable computer-readable storage media, such as memory 304, for instance. For example, processor 306 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi-core, or any other digital or analog circuitry configured to interpret and/or to execute program instructions and/or to process data, whether loaded from memory or implemented directly in hardware.

Memory 304 may be on-chip (e.g., internal) memory or off-chip (e.g., external) memory, such as, for example, flash memory. Analysis module 306 is programmed or otherwise configured to provide the out-of-band monitoring and alert services as variously described herein at least in conjunction with integrity monitor 108. By way of one example, as described herein, analysis module 306 may hash the contents of a critical system memory 104 page and compare the computed hash value to a corresponding golden hash value to determine the integrity of the critical system memory 104 page and/or host virtualization system 100.

In some embodiments, integrity monitor 108 and memory context module 112 and related components, such as, for example, hypervisor 110 and system memory 104, may be connected or otherwise communicatively coupled through an interconnect interface 308. Interconnect interface 140 may be a peripheral component interconnect (PCI) express (PCIe) interface, a serial peripheral interface (SPI), a low pin count (LPC) interface, or any other suitable interconnect interface. In some embodiments, interconnect interface 308 may be configured to provide a secure communication channel.

Figure 4:
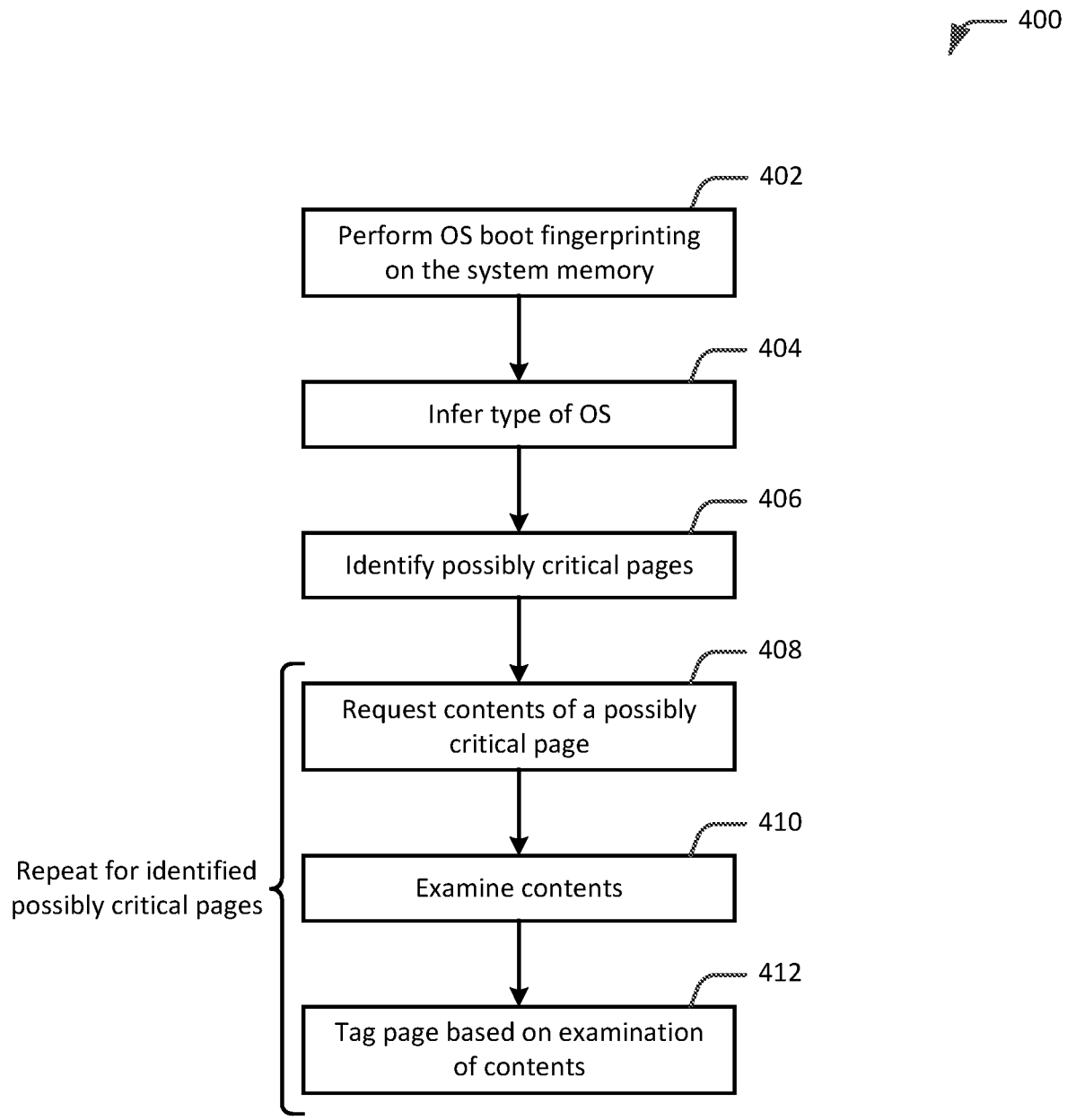
FIG. 4 is a flow diagram illustrating an example process for context tagging system memory pages, in accordance with an embodiment of the present disclosure.

FIG. 4 is a flow diagram illustrating an example process 400 for context tagging system memory pages, in accordance with an embodiment of the present disclosure. At 402, memory context module 112 may perform OS boot fingerprinting on system memory 104. OS boot fingerprinting may be performed when an OS, such as guest OS 116 is provisioned and started, or soon thereafter, in host virtualization system 100 to determine the type of OS that is running. At 404, memory context module 112 may infer the type of OS that is running based on the OS boot fingerprint. At 406, memory context module 112 may identify possibly critical system memory 104 pages based on the inferred OS type. For example, this inference may be based on how an OS spatially or temporally accesses memory.

At 408, memory context module 112 may request the contents of a possibly critical system memory 104 page. This memory page is one memory page of the possibly critical system memory 104 pages identified at 406. For example, memory context module 112 may make the request to CPU 106 to provide the contents of the possibly critical system memory 104 page. At 410, memory context module 112 may examine the contents of the memory page to determine whether the system memory 104 page is a critical memory page that may be monitored. The system memory 104 pages that are determined to be monitored may be identified (or tagged) as critical system memory pages. In an embodiment, memory context module 112 may identify system memory 104 page whose contents provide an indication of the integrity of host virtualization system 100 as a critical system memory page. At 412, memory context module 112 may tag the system memory 104 page based on the examination of its contents. For example, memory context module 112 may assign one or more context tag(s) 206 to an extended page table entry 204 for the system memory 104 page in EPT 202. Memory context module 112 may perform 408-412 for each of the other identified possibly critical system memory 104 pages to assign corresponding context tag(s) 206.

Figure 5:
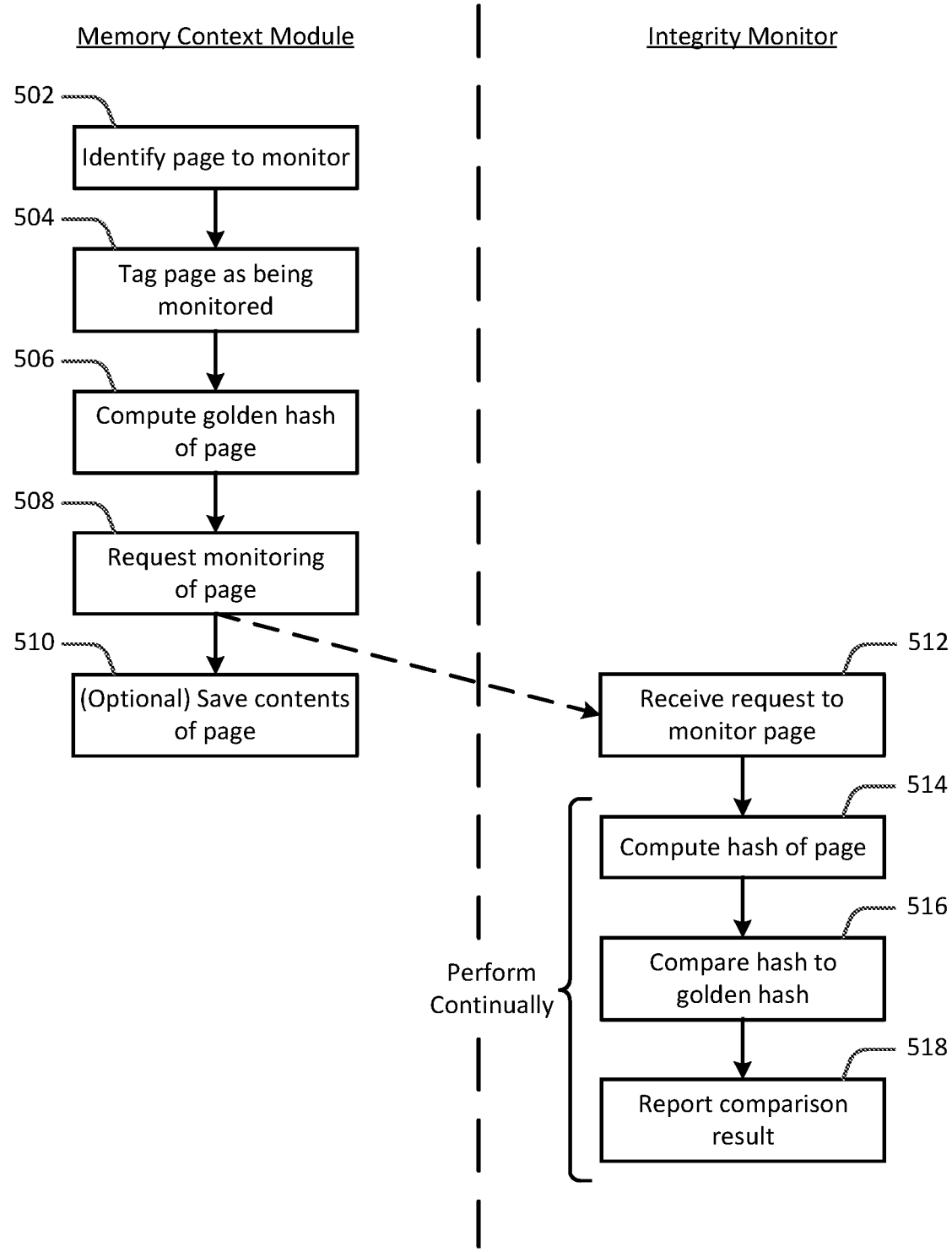
FIG. 5 is a flow diagram illustrating an example process for performing out-of-band context-aware monitoring of system memory pages, in accordance with an embodiment of the present disclosure.

FIG. 5 is a flow diagram illustrating an example process 500 for performing out-of-band context-aware monitoring of system memory pages, in accordance with an embodiment of the present disclosure. At 502, memory context module 112 may identify a system memory 104 page to monitor. For example, the identification may be based on the respective context tag(s) 206 assigned to system memory 104 pages. In an embodiment, memory context module 112 may identify for monitoring a system memory 104 page identified or tagged as being critical. In some embodiments, an application running within VM 114 may employ an interface provided by memory context module 112 to request monitoring of one or more specified system memory 104 pages. As an example, an application may store critical immutable data, such as cryptographic keys or sensitive algorithms, in system memory 104 and rely on integrity monitor 108 to enforce the immutability. In this case, the application can pass the virtual address to memory context module 112 through the VM, such as VM 114, which can translate the virtual address to a physical address.

At 504, memory context module 112 may tag the identified system memory 104 page as being monitored. For example, memory context module 112 may assign a context tag 206 to an extended page table entry 204 for the identified system memory 104 page in EPT 202. The assigned context tag 206 may indicate that the page is being monitored. At 506, memory context module 112 may hash the contents of the identified system memory 104 page to compute a golden hash value. The computed golden hash value is representative of the original or valid (i.e., not altered or not tampered) contents of the identified system memory 104 page.

At 508, memory context module 112 may request monitoring of the identified system memory 104 page by integrity monitor 108. Memory context module 112 may provide integrity monitor 108 the golden hash value for the identified system memory 104 page. At 510, memory context module 112 may optionally save the contents of the identified system memory 104 page that will be monitored by integrity monitor 108. For example, the saved contents may be used to perform hot patching or other memory-recovery operation of the identified system memory 104.

At 512, integrity monitor 108 may receive the request made by memory context module 112 to monitor the identified system memory 104 page. At 514, integrity monitor 108 may hash the contents of the identified system memory 104 page and compute a hash value. In an embodiment, integrity monitor 108 may perform DMA transactions with system memory 104 to retrieve or otherwise read the contents of the identified system memory 104 page for hashing. In some embodiments, memory context module 112 may request CPU 106 to provide integrity monitor 108 DMA capabilities to allow integrity monitor 108 to perform the appropriate DMA transactions.

At 516, integrity monitor 108 may compare the computed hash value to the corresponding golden hash value provided by memory context module 112. At 518, integrity monitor 108 may report the results of the comparison. For example, in an implementation, if the comparison of the hash values indicates an integrity issue or violation involving the modification of immutable memory (e.g., an issue with the integrity of host virtualization system 100 or components thereof), for example, integrity monitor 108 may generate an out-of-band alert or response. Examples of alerts or responses include logging the violation, shutting down the system, "hot patching" the modified data, entering a known safe mode, or securely deleting sensitive data. Integrity monitor 108 may continually and/or periodically compute a hash of the contents of the identified system memory 104 page and compare computed hash value to the golden hash value to detect any integrity issues or violations. For example, integrity monitor 108 may perform computation and comparison of the hash values every 100 ms or other suitable interval of time based on the specific use case. In some embodiments, integrity monitor 108 may perform computation and comparison of the hash values periodically with a suitable latency, such as every 10 ms, or other suitable time value. Additionally or alternatively, in some embodiments, integrity monitor 108 may perform computation and comparison of the hash values in response to an event, such as memory access, application request, or system shutdown.

Figure 6:
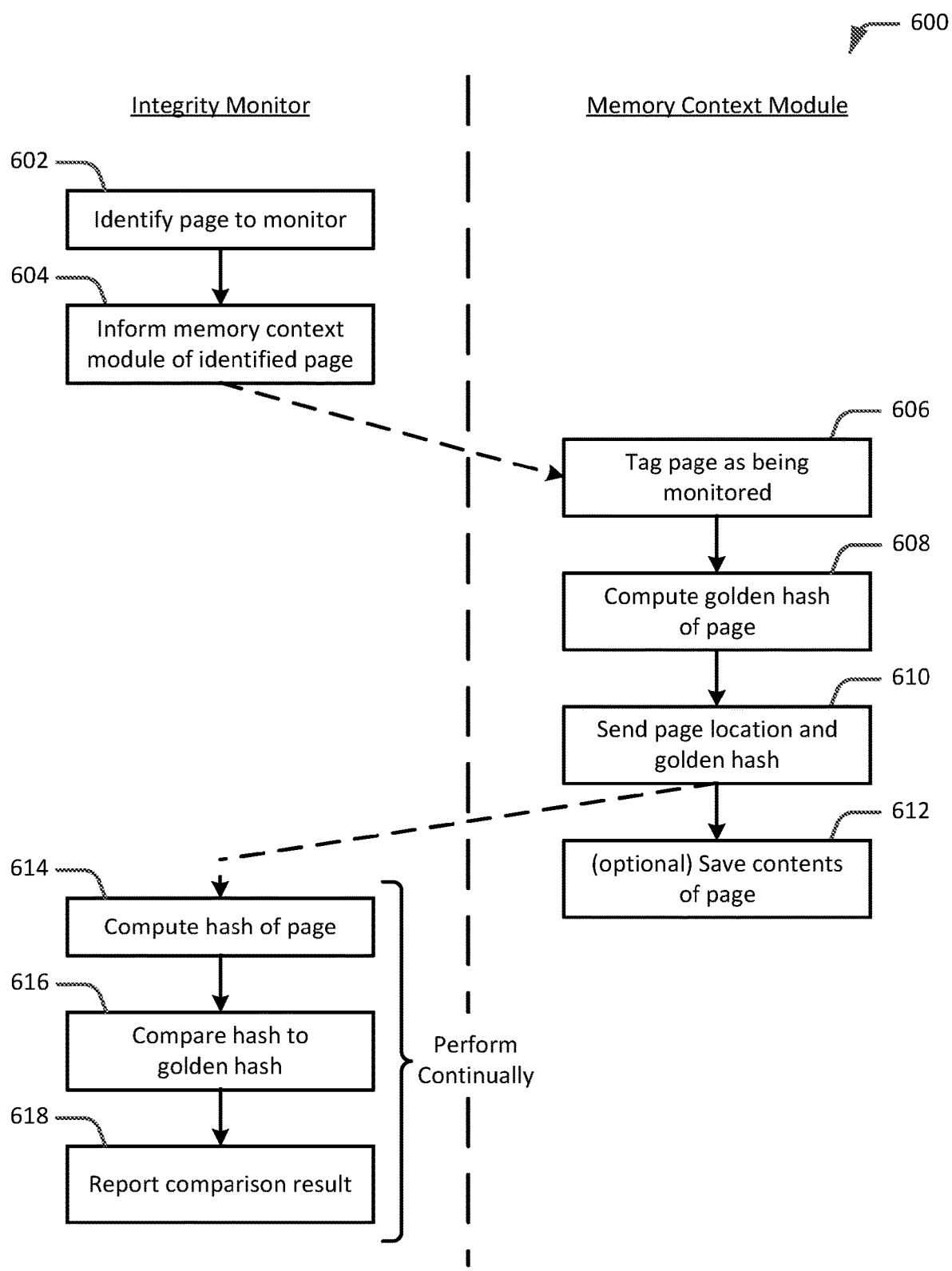
FIG. 6 is a flow diagram illustrating another example process for performing out-of-band context-aware monitoring of system memory pages, in accordance with an embodiment of the present disclosure.

FIG. 6 is a flow diagram illustrating an example process 600 for performing out-of-band context-aware monitoring of system memory pages, in accordance with an embodiment of the present disclosure. At 602, integrity monitor 108 may identify a system memory 104 page to monitor and inform a memory context module of the identified page. A memory context module tags the page as being monitored, computes a golden hash of the page, sends the page location and the golden hash to the integrity monitor and optionally saves contents of the page. Once the integrity monitor receives the page location and the golden hash, the integrity monitor computes a hash of the page, compares the hash to the golden hash and reports results of the comparison. These processes (614-618) are performed continually. In embodiments, the hashes may be securely computed (e.g., hash-based message authentication code (HMAC)) to prevent replay or spoofing attacks.

Figure 7:
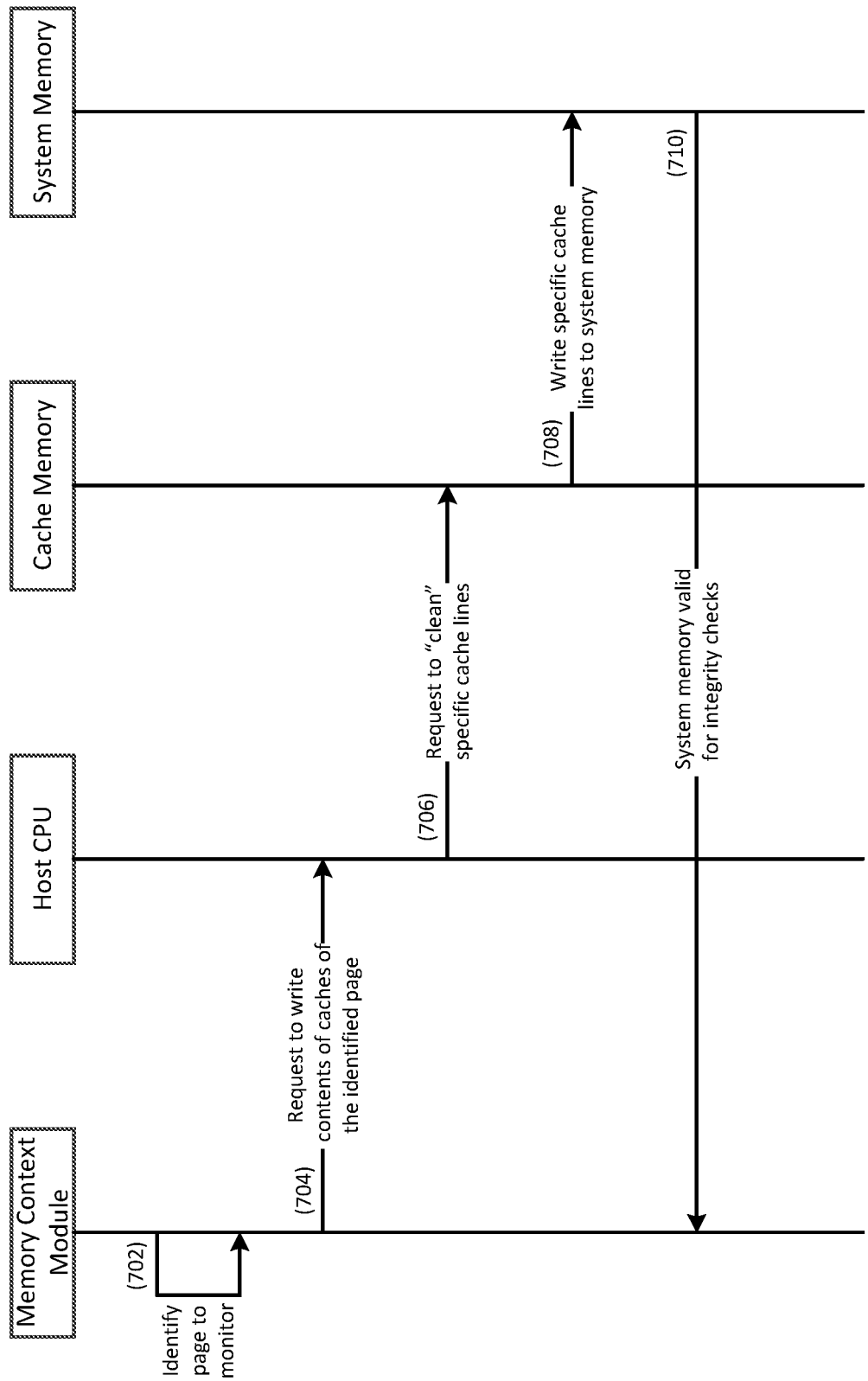
FIG. 7 illustrates an example flow of interactions between various components to establish coherence between caches and system memory, in accordance with an embodiment of the present disclosure.

FIG. 7 illustrates an example flow of interactions between various components to establish coherence between caches and system memory, in accordance with an embodiment of the present disclosure. For example, due to local caches maintained by VMs, such as VM 114, in host virtualization system 100, the contents of system memory 104 may not actually reflect the state of host virtualization system 100. Thus, before performing the monitoring of the critical system memory 104 pages to check the integrity of the monitored pages, the data in the local caches are written back to system memory 104 to establish data coherence.

To establish data coherence between caches maintained by VMs and system memory 102, memory context module 112 may identify (702) a system memory 104 page that is being monitored. In some embodiments, the identified system memory 104 page that is being monitored is a critical system memory 104 page. Memory context module 112 may then request (704) CPU 106 to write the contents of the caches of the identified system memory 104 page to system memory 104. Upon receiving the request, CPU 106 may issue a request (706) or otherwise cause the appropriate cache lines (e.g., the cache lines corresponding to the identified system memory 104 page) to be written (708) to system memory 104. These processes (702-708) may be repeated to establish data coherence for the other system memory 104 pages that are being monitored. Once the data in the local caches are written to system memory 104, system memory 104 may be considered valid for integrity checks.

Figure 8:
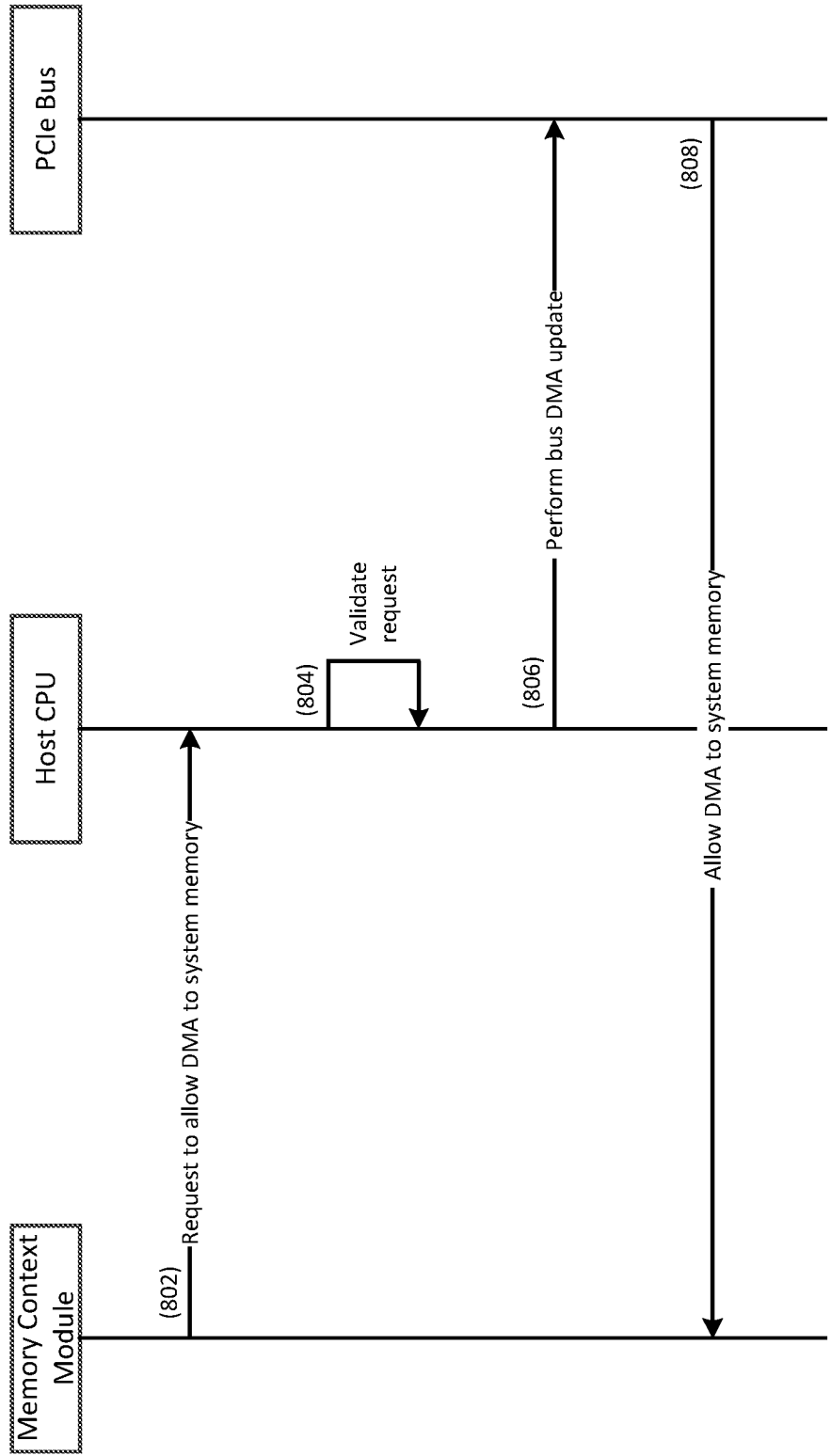
FIG. 8 illustrates an example flow of interactions between various components to establish direct memory access (DMA) to system memory, in accordance with an embodiment of the present disclosure.

FIG. 8 illustrates an example flow of interactions between various components to establish direct memory access (DMA) to system memory, in accordance with an embodiment of the present disclosure. For example, in some cases, CPU 106 may be restricting DMA capabilities of integrity monitor 108, which may prevent integrity monitor 108 from monitoring the critical system memory 104 pages. To remove any such restrictions, memory context module 112 may request (802) CPU 106 to allow integrity monitor 108 to perform DMA transactions with system memory 104. Upon receiving the request, CPU 106 may validate (804) the request and, if validated, perform (806) a bus DMA update (e.g., VT-D configuration) to allow (808) integrity monitor 108 DMA to system memory 104. For example, the DMA memory may be confirmed to be in the range of monitored memory before selective DMA access is granted. Alternatively, if fine grain DMA access control is not available, then DMA access may be provided for a limited time to allow DMA access for memory context module 112.

Figure 9:
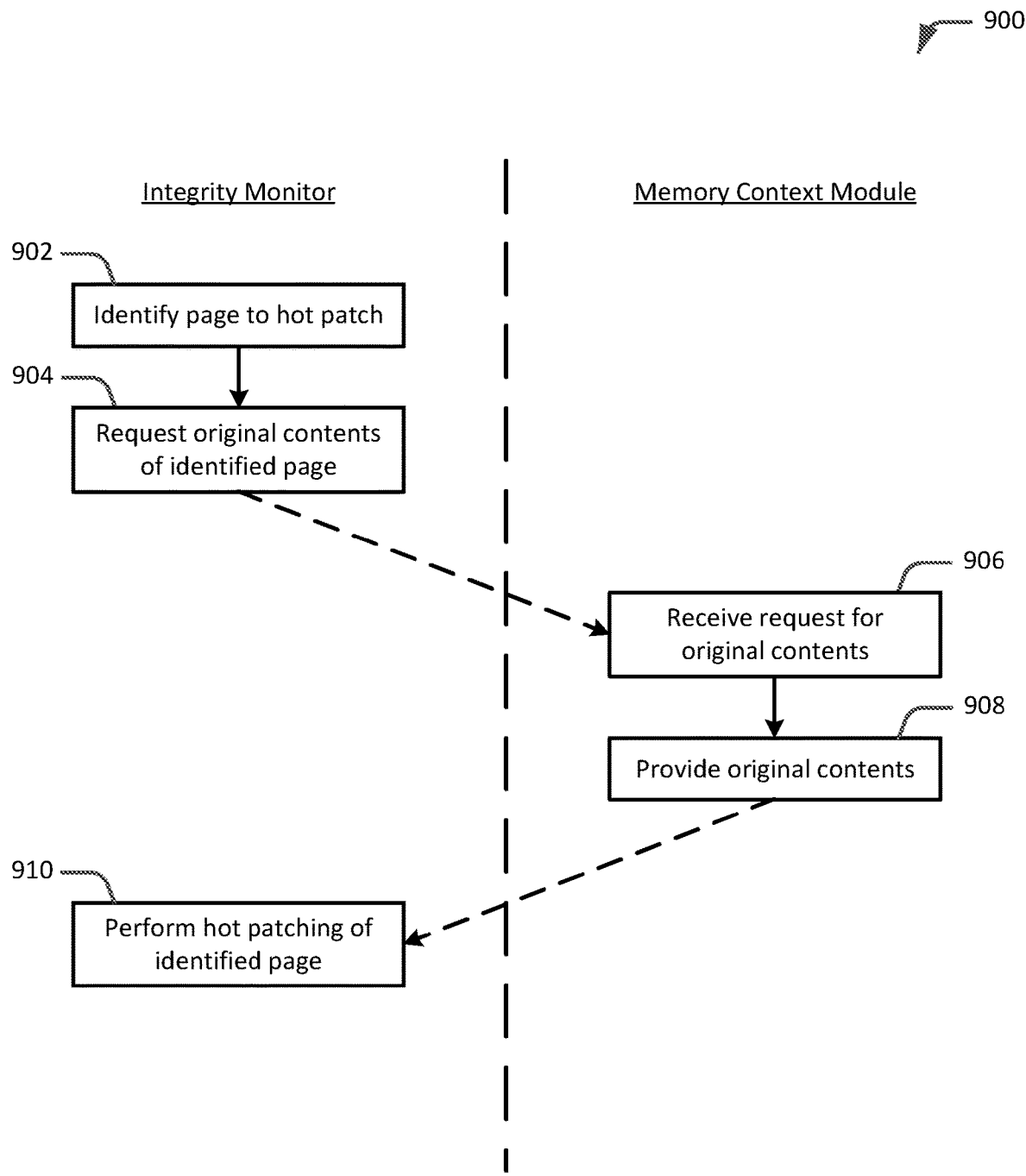
FIG. 9 is a flow diagram illustrating an example process for performing hot patching of system memory pages, in accordance with an embodiment of the present disclosure.

FIG. 9 is a flow diagram illustrating an example process 900 for performing hot patching of system memory pages, in accordance with an embodiment of the present disclosure. For example, it may be possible that the monitoring performed by integrity monitor 108 may detect an alteration or modification of the contents of a critical system memory 104 page whose contents should not be altered or modified. At 902, integrity monitor 108 may identify a system memory 104 page to hot patch. The system memory 104 page to hot patch may be identified based on the results of the comparison of a hash value representative of the current contents of the system memory 104 page to a golden hash value. Having identified a system memory 104 page to hot patch, at 904, integrity monitor 108 may request the original contents of the identified system memory 104 page from memory context module 112.

At 906, memory context module 112 may receive the request made by integrity monitor 108 for the original contents of the identified system memory 104 page. At 908, memory context module 112 may provide or otherwise make available the requested original contents to integrity monitor 108. In an embodiment, memory context module 112 may have saved the original contents of the identified system memory 104 page at or about the time it made the request to integrity monitor 108 to monitor this system memory 104 page. At 910, integrity monitor 112 may perform hot patching of the identified system memory 104 page using the original contents provided by memory context module 112.

In some embodiments, memory context module 112 may perform the hot patching of the identified system memory 104 page. In such embodiments, integrity monitor 108 may identify a system memory 104 page to hot patch, and inform memory context module 112 that the contents of the identified system memory 104 page have been altered.

Figure 10:
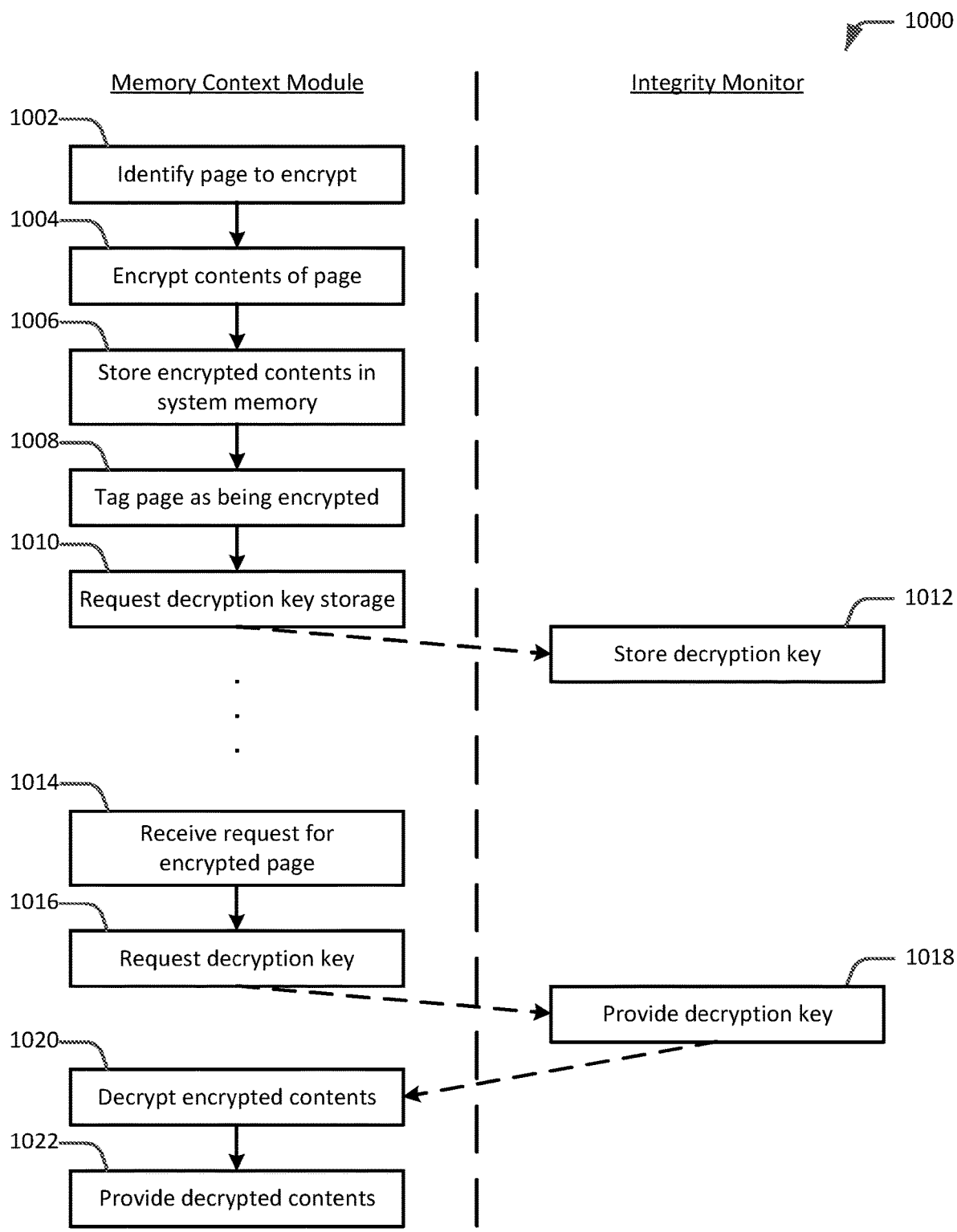
FIG. 10 is a flow diagram illustrating an example process 1000 for providing data encryption of critical system memory pages, in accordance with an embodiment of the present disclosure.

FIG. 10 is a flow diagram illustrating an example process 1000 for providing data encryption of critical system memory pages, in accordance with an embodiment of the present disclosure. For example, in an embodiment, the data in a critical system memory 104 page may be encrypted when the system memory 104 page is identified as being critical or identified to be monitored. Additionally or alternatively, the data in a critical system memory 104 page may be encrypted when the critical system memory 104 page expires and is written to system memory 104.

At 1002, memory context module 112 may identify a system memory 104 page to encrypt. At 1004, memory context module 112 may encrypt the contents of the identified system memory 104 page and, at 1006, store the encrypted contents in the appropriate page in system memory 104. At 1008, memory context module 112 may tag or otherwise indicate that the contents of the identified system memory 104 page are encrypted. At 1010, memory context module 112 may request integrity monitor 108 to store a decryption key that is needed to decrypt the encrypted contents. Upon receiving the request, at 1012, integrity monitor 108 may store the decryption key provided by memory context module 112.

Subsequently, at 1014, memory context module 112 may receive a request for an encrypted system memory 104 page (i.e., a system memory 104 page whose contents are encrypted). At 1016, memory context module 112 may request the appropriate decryption key for decrypting the encrypted contents from integrity monitor 108. Upon receiving the request, at 1018, integrity monitor 108 may provide the requested decryption key to memory context module 112. At 1020, memory context module 112 may use the provided decryption key to decrypt the encrypted contents of the requested system memory 104 page. At 1022, memory context module 112 may provide or otherwise make available to decrypted contents to the requestor of the encrypted system memory 104 page. In some cases, the decryption may be done directly by integrity monitor 108, in which case the decryption key would not need to leave the security perimeter of integrity monitor 108.

In some embodiments, integrity monitor 108 may data encryption service. In such embodiments, memory context module 112 may identify a system memory 104 page to encrypt or decrypt, and inform integrity monitor 108 that the contents of the identified system memory 104 page are to be encrypted or decrypted.

Figure 11:
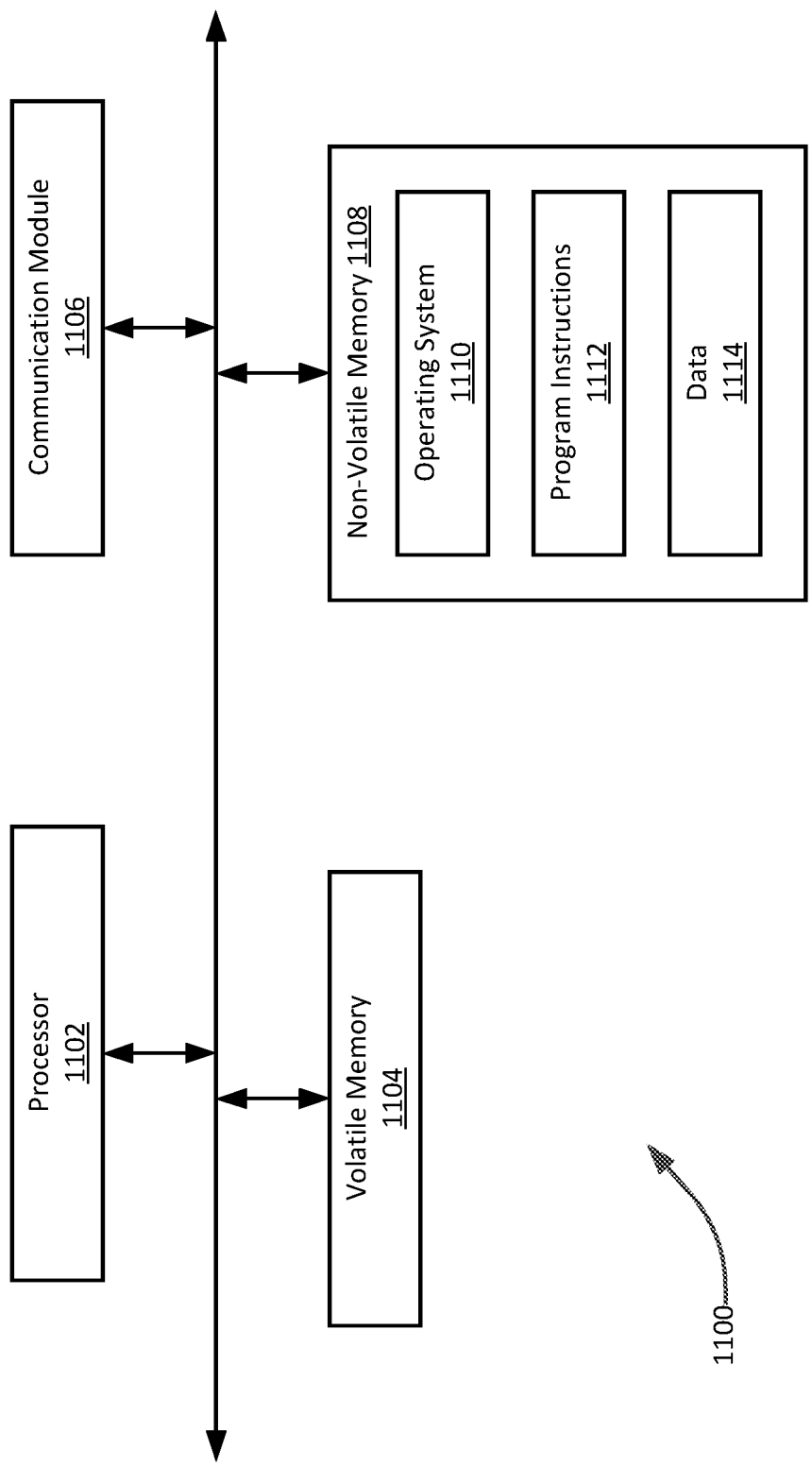
FIG. 11 is a block diagram illustrating selective components of an example computing device in which various aspects of the disclosure may be implemented, in accordance with an embodiment of the present disclosure.

FIG. 11 is a block diagram illustrating selective components of an example computing device 1100 in which various aspects of the disclosure may be implemented, in accordance with an embodiment of the present disclosure. In some embodiments, computing device 1100 may be configured to implement or direct one or more operations associated with some or all of the engines, components, and/or modules associated with system 100 of FIG. 1, including hypervisor 110, memory context module 112, and/or integrity monitor 108. In one example case, for instance, each of the processes performed by memory context module 112 and/or integrity monitor 108 as described herein may be stored on a non-volatile memory 1108 (e.g., a hard disk), loaded in a volatile memory 1104 (e.g., random access memory (RAM)), and executable by a processor 1102. However, the illustrated computing device 1100 is shown merely as an example and one skilled in the art will appreciate that components of system 100 of FIG. 1, including context module 112 and/or integrity monitor 108, may be implemented by any computing or processing environment and with any type of machine or set of machines that may have suitable hardware and/or software capable of operating as described herein.

In some embodiments, computing device 1100 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. In some embodiments, a distributed computational system may be provided comprising multiple of such computing devices. As shown in FIG. 11, computing device 1100 includes processor 1102, volatile memory 1104, a communication module 1106, and non-volatile memory 1108, which includes an operating system 1110, program instructions 1112, and data 1114. Processor 1102, volatile memory 1104, communication module 1106, and non-volatile memory 1108 may be communicatively coupled. In various embodiments, additional components (not illustrated, such as a display, user interface, input/output interface, etc.) or a subset of the illustrated components can be employed without deviating from the scope of the present disclosure.

Processor 1102 may be designed to control the operations of the various other components of computing device 1100. Processor 1102 may include any processing unit suitable for use in computing device 1100, such as a single core or multicore processor. In general, processor 1102 may include any suitable special-purpose or general-purpose computer, computing entity, or computing or processing device including various computer hardware, or firmware, and may be configured to execute instructions, such as program instructions, stored on any applicable computer-readable storage media. For example, processor 1102 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi-core, or any other digital or analog circuitry configured to interpret and/or to execute program instructions and/or to process data, whether loaded from memory or implemented directly in hardware. Although illustrated as a single processor in FIG. 11, processor 1102 may include any number of processors and/or processor cores configured to, individually or collectively, perform or direct performance of any number of operations described in the present disclosure.

For example, in some embodiments, any one or more of the engines, components and/or modules of system 100 may be included non-volatile memory 1108 as program instructions 1112. For example, in such embodiments, program instructions 1112 cause computing device 1100 to implement functionality in accordance with the various embodiments and/or examples described herein. Processor 1102 may fetch some or all of program instructions 1112 from non-volatile memory 1108 and may load the fetched program instructions 1112 in volatile memory 1104. Subsequent to loading the fetched program instructions 1112 into volatile memory 1104, processor 1102 may execute program instructions 1112 such that the various embodiments and/or examples with respect to context-aware system memory monitoring, including processes 400, 500, 600, 900, and 1000 and the interactions illustrated in FIGS. 7 and 8, as variously described herein are performed.

In some embodiments, virtualization may be employed in computing device 1100 so that infrastructure and resources in computing device 1100 may be shared dynamically. For example, a VM may be provided to handle a process running on multiple processors so that the process appears to be using only one computing resource rather than multiple computing resources. Multiple VMs may also be used with one processor.

Volatile memory 1104 may include computer-readable storage media configured for carrying or having computer-executable instructions or data structures stored thereon. Such computer-readable storage media may include any available media that may be accessed by a general-purpose or special-purpose computer, such as processor 1102. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Communication module 1106 can be any appropriate network chip or chipset which allows for wired or wireless communication via a network, such as, by way of example, a local area network (e.g., a home-based or office network), a wide area network (e.g., the Internet), a peer-to-peer network (e.g., a Bluetooth connection), or a combination of such networks, whether public, private, or both. Communication module 506 can also be configured to provide intra-device communications via a bus or an interconnect.

Non-volatile memory 1108 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with volatile memory 1104, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media. Computer-executable instructions may include, for example, instructions and data configured to cause processor 1102 to perform a certain operation or group of operations. Non-volatile memory 1108 may be provided on computing device 1100 or provided separately or remotely from computing device 1100.

Operating system 1110 may comprise any suitable operating system, such as UNIX®, LINUX®, MICROSOFT® WINDOWS® (Microsoft Crop., Redmond, WA), GOOGLE® ANDROID™ (Google Inc., Mountain View, CA), APPLE® iOS (Apple Inc., Cupertino, CA), or APPLE® OS X° (Apple Inc., Cupertino, CA). As will be appreciated in light of this disclosure, the techniques provided herein can be implemented without regard to the particular operating system provided in conjunction with computing device 1100, and therefore may also be implemented using any suitable existing or subsequently developed platform. Processor 1102 may fetch some or all of computer instructions of operating system 1110 from non-volatile memory 1108 and may load the fetched computer instructions in volatile memory 1104. Subsequent to loading the fetched computer instructions of operating system 1110 into volatile memory 1104, processor 1102 may execute operating system 1110.

As will be further appreciated in light of this disclosure, with respect to the processes, methods, and interactions disclosed herein, the functions performed in the processes, methods, and interactions may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method comprising:
   determining, by a hypervisor, that an operating system (OS) is started in a host virtualization system, wherein the started OS comprises a boot fingerprint comprising an allocation of one or more host physical memory (HPM) pages;
   examining, by the hypervisor, contents of at least one system memory page of the one or more HPM pages to determine a type of OS that is loaded on the at least one system memory page of the one or more HPM pages, wherein the examination comprises analyzing information loaded on the one or more HPM pages when the OS is started and based on the boot fingerprint, wherein the boot fingerprint identifies various operating systems based on the one or more HPM pages storing particular aspects of the OS in specific addresses; and
   assigning, by the hypervisor and subsequent to the examination, at least one tag to the at least one system memory page of the one or more HPM pages based on the determined type of OS and the examination of the contents of the at least one system memory page of the one or more HPM pages,
wherein the at least one tag indicates characteristics of the contents stored in the at least one system memory page of the one or more HPM pages including characteristics of data stored in an extended page table (EPT), and wherein the at least one tag allows for context-aware monitoring of the at least one system memory page.

2. The computer-implemented method of claim 1, wherein the at least one tag indicates a type of data stored in the at least one system memory page.

3. The computer-implemented method of claim 1, wherein the at least one tag indicates that the at least one system memory page is a critical system memory page.

4. The computer-implemented method of claim 3, further comprising:
hashing the contents of the at least one system memory page to compute a hash value; and
comparing the computed hash value to a corresponding golden hash value to determine the integrity of the least one system memory page.

5. A system comprising:
one or more non-transitory machine-readable mediums configured to store instructions; and
one or more processors configured to execute the instructions stored on the one or more non-transitory machine-readable mediums, wherein execution of the instructions causes the one or more processors to:
determine, by a hypervisor, that an operating system (OS) is started in a host virtualization system, wherein the started OS comprises a boot fingerprint comprising an allocation of one or more host physical memory (HPM) pages;
examine, by the hypervisor, contents of at least one system memory page of the one or more HPM pages to determine a type of OS that is loaded on the at least one system memory page of the one or more HPM pages, wherein the examination comprises analyzing information loaded on the one or more HPM pages when the OS is started and based on the boot fingerprint, wherein the boot fingerprint identifies various operating systems based on the one or more HPM pages storing particular aspects of the OS in specific addresses; and
assign, by the hypervisor and subsequent to the examination, at least one tag to the at least one system memory page of the one or more HPM pages based on the determined type of OS and the examination of the contents of the at least one system memory page of the one or more HPM pages, wherein the at least one tag indicates characteristics of the contents stored in the at least one system memory page of the one or more HPM pages including characteristics of data stored in an extended page table (EPT), and wherein the at least one tag allows for context-aware monitoring of the at least one system memory page.

6. The system of claim 5, wherein the at least one tag indicates a type of data stored in the at least one system memory page.

7. The system of claim 5, wherein the at least one tag indicates that the at least one system memory page is a critical system memory page.

8. The system of claim 7, wherein execution of the instructions causes the one or more processors to:
hash the contents of the at least one system memory page to compute a hash value; and
compare the computed hash value to a corresponding golden hash value to determine the integrity of the least one system memory page.

9. A computer program product including one or more non-transitory machine readable mediums encoded with instructions that when executed by one or more processors cause a process to be carried out, the process comprising:
determining, by a hypervisor, that an operating system (OS) is started in a host virtualization system, wherein the started OS comprises a boot fingerprint comprising an allocation of one or more host physical memory (HPM) pages;
examining, by the hypervisor, contents of at least one system memory page of the one or more HPM pages to determine a type of OS that is loaded on the at least one system memory page of the one or more HPM pages, wherein the examination comprises analyzing information loaded on the one or more HPM pages when the OS is started and based on the boot fingerprint, wherein the boot fingerprint identifies various operating systems based on the one or more HPM pages storing particular aspects of the OS in specific addresses; and
assigning, by the hypervisor and subsequent to the examination, at least one tag to the at least one system memory page of the one or more HPM pages based on the determined type of OS and the examination of the contents of the at least one system memory page of the one or more HPM pages,
wherein the at least one tag indicates characteristics of the contents stored in the at least one system memory page of the one or more HPM pages including characteristics of data stored in an extended page table (EPT), and wherein the at least one tag allows for context-aware monitoring of the at least one system memory page.

10. The computer program product of claim 9, wherein the at least one tag indicates a type of data stored in the at least one system memory page.

11. The computer program product of claim 9, wherein the at least one tag indicates that the at least one system memory page is a critical system memory page.

12. The computer program product of claim 11, the process further comprising:
hashing the contents of the at least one system memory page to compute a hash value; and
comparing the computed hash value to a corresponding golden hash value to determine the integrity of the least one system memory page.

* * * * *